United States Patent
Mizuno et al.

(10) Patent No.: US 8,182,350 B2
(45) Date of Patent: May 22, 2012

(54) SEALING STRUCTURE AND SPIDER JOINT

(75) Inventors: Koichiro Mizuno, Kashiwara (JP); Koji Kawaguchi, Izumi (JP); Tomotaka Nakagawa, Nara (JP)

(73) Assignee: JTEKT Corporation, Osaka (JP)

( * ) Notice: Subject to any disclaimer, the term of this patent is extended or adjusted under 35 U.S.C. 154(b) by 498 days.

(21) Appl. No.: 11/569,834

(22) PCT Filed: May 26, 2005

(86) PCT No.: PCT/JP2005/009617
§ 371 (c)(1),
(2), (4) Date: Sep. 22, 2008

(87) PCT Pub. No.: WO2005/119106
PCT Pub. Date: Dec. 15, 2005

(65) Prior Publication Data
US 2009/0026714 A1    Jan. 29, 2009

(30) Foreign Application Priority Data

Jun. 3, 2004 (JP) .................................. 2004-165817
Jun. 3, 2004 (JP) .................................. 2004-165999

(51) Int. Cl.
*F16J 15/32* (2006.01)
(52) U.S. Cl. .......................... 464/131; 277/560; 277/562
(58) Field of Classification Search ................ 464/131, 464/133; 277/560, 562, 567
See application file for complete search history.

(56) References Cited

U.S. PATENT DOCUMENTS

| | | | | |
|---|---|---|---|---|
| 3,906,746 A | * | 9/1975 | Haines | ........................ 464/131 |
| 6,573,705 B1 | | 6/2003 | Tajima et al. | |
| 2003/0202723 A1 | | 10/2003 | Tajima et al. | |

FOREIGN PATENT DOCUMENTS

| | | | | |
|---|---|---|---|---|
| DE | 31 18 430 A1 | * | 11/1982 | ................... 464/131 |
| JP | 51-77453 | | 6/1976 | |
| JP | 53-88646 A | | 7/1978 | |
| JP | 62-278317 A | | 12/1987 | |
| JP | 3-20612 B2 | | 10/1988 | |
| JP | 6-40336 Y2 | | 10/1994 | |
| JP | 11-223223 A | | 8/1999 | |
| JP | 2002-106594 A | | 4/2002 | |

OTHER PUBLICATIONS

International Search Report of PCT/JP2005/009617, date of mailing Sep. 20, 2005.
Notification of Reasons for Refusal dated Sep. 1, 2009, issued in corresponding Japanese Patent Application No. 2004-165817.

* cited by examiner

*Primary Examiner* — Gregory Binda
(74) *Attorney, Agent, or Firm* — Westerman, Hattori, Daniels & Adrian, LLP

(57) ABSTRACT

A lip portion consists of two cylindrical axial lips 421, 422 extended in parallel to an axial direction of a seal 4 and in different lengths (a radial lip is obviated). A neck 22 of a cross shaft 2 is formed with a neck slant portion 221 defined by a conical surface inclined at 45° relative to an axis thereof. The two axial lips 421, 422 are pressed against the neck slant portion in the axial direction.

5 Claims, 15 Drawing Sheets

SEALING STRUCTURE AND SPIDER JOINT

TECHNICAL FIELD

The present invention relates to a sealing structure and more particularly, to a sealing structure for spider joint.

BACKGROUND ART

A universal joint for use in an automotive drive shaft or steering assembly, for example, is required of muddy-water resistance because the universal joint is exposed to splashes of muddy water from tires or road surface. FIG. 13 is a front view (partly in section) showing a spider joint 10 as a principal member constituting such a universal joint. Referring to the figure, a bearing cup 3 is assembled on each of four races 21 of a cross shaft 20. The bearing cup 3 is provided with needle rollers 32 on an inside surface of a cup 31, so that the cup 31 is free to rotate relative to the race 21. The cup 31 is formed with a circumferential groove 3a in an outer peripheral surface thereof (There is also known a cup free from the circumferential groove 3a). A ring-like seal 40 is attached to an end of the bearing cup 3, thereby sealing a gap between a neck 23 of the cross shaft 20 and the cup 31.

FIG. 14 is an enlarged view of a part XIV in FIG. 13 (similar structures disclosed in, for example, Japanese Unexamined Patent Publication No. 2002-106594, Japanese Unexamined Utility Model Publication No. S53 (1978)-88646 and Japanese Unexamined Patent Publication No. H11 (1999)-223223). Referring to the figure, the cross shaft 20 includes the neck 23 on a proximal side of the race 21, such that the seal 40 may be pressed against the neck 23. In the sectional shape shown in the figure, the neck 23 includes: a straight portion 231 defined by a straight line parallel to the central axis of the race 21 (three-dimensionally defined by a cylindrical surface); a neck slant portion 232 defined by a straight line inclined at a steep angle (e.g., approximately 75°) relative to the straight portion 231 (three-dimensionally defined by a conical surface); and a neck-R portion 233 defined by an arcuate line interposed between these portions. On the other hand, the seal 40 includes: a metal annular body 41 press-inserted and fixed in the cup 31; and a rubber seal body 43 formed integrally with the metal annular body 41. Although the seal body 43 is depicted in a shape of a free state, the seal body is actually elastically deformed as pressed against the cross shaft 20.

The seal body 43 Includes: an axial lip 43a pressed against the neck slant portion 232; and a radial lip 43r pressed against the straight portion 231. In this seal 40, an extension direction of the axial lip 43a is angled at about 25°, for example, relative to the central axis of the race 21, whereas an extension direction of the radial lip 43r is angled at about −40°, for example, relative to the central axis of the race.

The above cross shaft 20 may be assembled with unillustrated yokes as follows. The race 21 is inserted in a hole of the yoke and then, the bearing cup 3 (with the seal 40 press-inserted therein) is assembled on the race 21. Subsequently, a snap ring (not shown) is fitted in the circumferential groove 3a of each of the two bearing cups 3 on the opposite ends of one shaft of the cross shaft. Thus, the spider joint 10 is connected with one of the yokes. The other yoke is connected with the spider joint in the same way.

By making connection in the aforementioned manner, the bearing cup 3 is forcibly moved to a predetermined axial position relative to the cross shaft 20, so that the axial lip 43a is pressed against the neck slant portion 232 by a predetermined amount of interference. On the other hand, the radial lip 43r is pressed against the straight portion 231 irrespective of the interference. Thus is realized a sealing structure having muddy-water resistance.

In the conventional spider joint as described above, the axial position of the bearing cup 3 relative to the cross shaft 20 is determined by its positional relation with the yoke, while the amount of interference of the seal 40 is determined by the axial position of the bearing cup. However, the size tolerances and assembly tolerances of individual parts make it difficult to maintain the amount of interference of the seal 40 exactly at a fixed value. In actual fact, the seal is varied in the amount of interference. The axial lip 43a is pressed against the steeply inclined neck slant portion 232.

Therefore, even a minor axial displacement of the axial lip 43a leads to a significant variation of the way the axial lip 43a is pressed against the neck slant portion. This entails a problem that the seal suffers an inconsistent muddy-water resistant performance. On the other hand, there is no problem about the above reassure-contact variations of the radial lip 43r so long as the radial lip is pressed against the straight portion 231. In the case of the maximum allowable error, however, the radial lip may be pressed against the neck-R portion 233. With the radial lip pressed against the neck-R portion 233, the seal may fail to achieve an adequate sealing performance.

DISCLOSURE OF THE INVENTION

In view of the aforementioned problems of the prior-art, the invention has an object to provide a sealing structure and a spider joint which exhibit a consistent, reliable sealing performance in spite of the varied amount of interference of the seal.

A sealing structure according to the invention comprises: a seal having a ring-like overall configuration and including a lip portion consisting of a plurality of cylindrical axial lips axially extended in different lengths; and a sealed portion having a conical surface positioned coaxially with the seal and allowing the plural axial lips to make contact with the conical surface in a direction of a central axis thereof.

According to the aforementioned sealing structure, the plural cylindrical axial lips pressed against the conical surface in the direction of the central axis thereof attain axial and radial straining forces such as to ensure the sealing performance. Such a sealing structure has small variations of contact surface pressure distribution relative to the variations of the amount of interference of the seal. Thus is provided the sealing structure which exhibits a consistent, reliable sealing performance in spite of the varied amount of interference of the seal.

The sealing structure according to the invention may also comprise: a seal having a ring-like overall configuration and including an axial lip extended substantially in parallel to an axial direction thereof; and a sealed portion having a conical surface positioned coaxially with the seal and inclined substantially at 45° relative to the central axis thereof, and allowing the axial lip to make contact with the conical surface in the direction of a central axis thereof.

According to the aforementioned sealing structure, the axial lip pressed against the conical surface inclined substantially at 45° attains the axial and radial straining forces such as to ensure the sealing performance. Such a sealing structure has small variations of contact surface pressure distribution relative to the variations of the amount of interference of the seal. Thus is provided the sealing structure which exhibits the consistent, reliable sealing performance in spite of the varied amount of interference of the seal.

A spider joint according to the invention comprises: a cross shaft formed with a neck slant portion on a proximal side of each race, the neck slant portion being defined by a conical surface inclined at a predetermined angle relative to an axis of the race; a bearing cup assembled on the race; and a seal assembled in the bearing cup, having a ring-like overall configuration and including a lip portion which is in contact with the neck slant portion in a direction of a central axis thereof and which consists of a plurality of cylindrical axial lips extended axially.

According to the aforementioned spider shaft, the plural cylindrical axial lips pressed against the neck slant portion in the direction of the central axis thereof attain the axial and radial straining forces such as to ensure the sealing performance. Such a spider joint has small variations of the contact surface pressure distribution relative to the variations of the amount of interference of the seal. Thus is provided the sealing structure which exhibits the consistent, reliable sealing performance in spite of the varied amount of interference of the seal.

A spider joint according to the invention may also comprise: a cross shaft formed with a neck slant portion on a proximal side of each race, the neck slant portion being defined by a conical surface inclined substantially at 45° relative to an axis of the race; a bearing cup assembled on the race; and a seal assembled in the bearing cup, having a ring-like overall configuration and including a lip portion which is in contact with the neck slant portion in a direction of the central axis thereof and which comprises an axial lip extended substantially in parallel to an axial direction.

According to the aforementioned spider shaft, the axial lip pressed against the neck slant portion, substantially having the inclination of 45°, in the direction of the central axis thereof attains the axial and radial straining forces such as to ensure the sealing performance. Such a spider joint has small variations of the contact surface pressure distribution relative to the variations of the amount of interference of the seal. Thus is provided the sealing structure which exhibits the consistent, reliable sealing performance in spite of the varied amount of interference of the seal.

According to the aforementioned spider joint, the seal may preferably have a greater inside diameter at the innermost circumference of the lip in a free state than an outside diameter of the race.

In this case, there is no lip interfering with the race when the bearing cup is assembled on the race. This obviates the inversion of the lip. Thus is provided the spider joint which is configured to prevent the inversion of the lip without impairing the sealing performance.

BEST MODES FOR CARRYING OUT THE INVENTION

Figure 1:
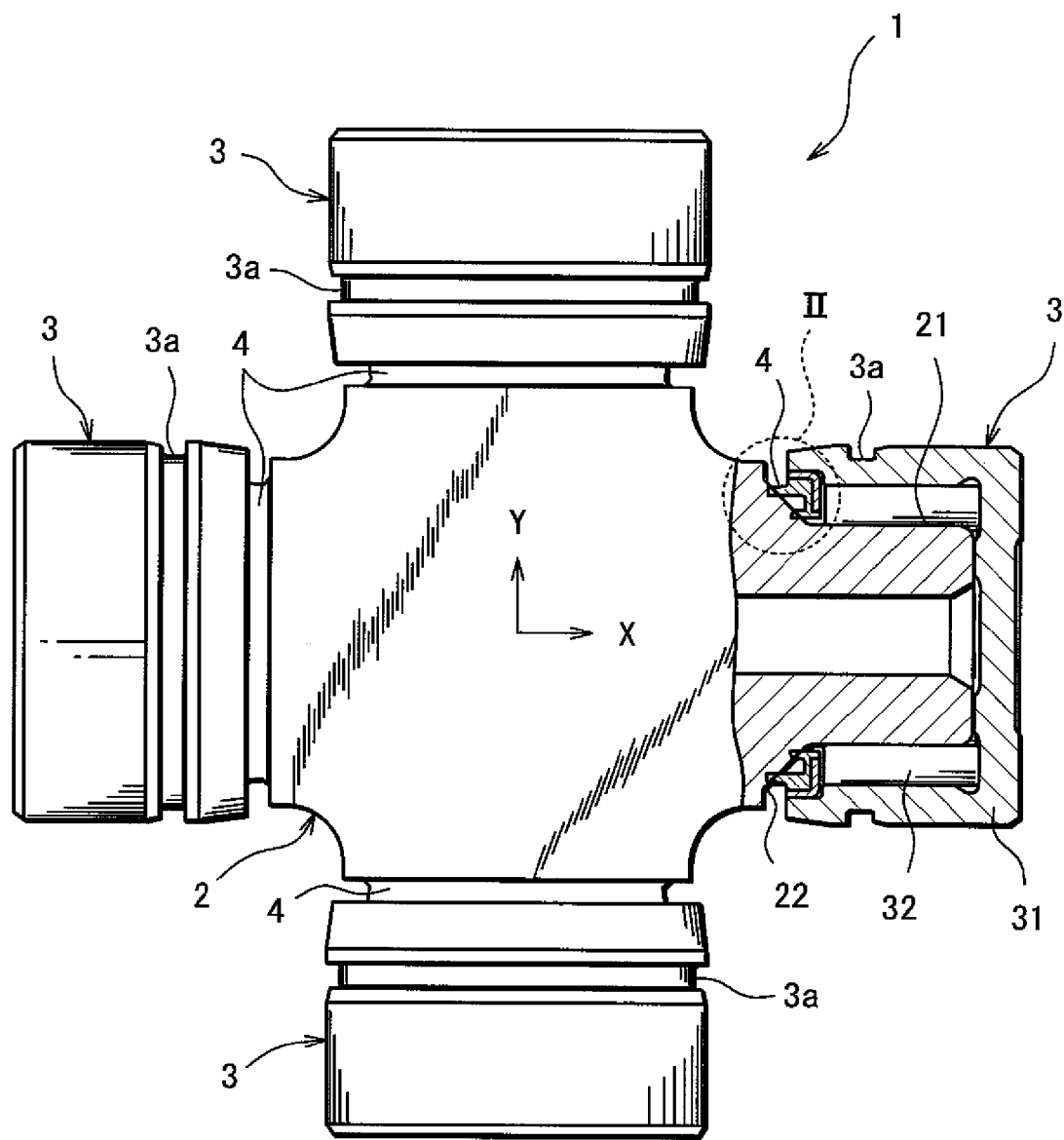
FIG. 1 is a front view (partly in section) showing a spider joint according to one embodiment of the invention.

FIG. 1 is a front view (partly in section) showing a spider joint 1 according to one embodiment of the invention. The spider joint 1 is a principal member constituting a universal joint for use in automotive drive shafts or steering assemblies. Referring to the figure, a cross shaft 2 consisting of two shafts in X and Y directions includes four races 21, each of which is assembled with a bearing cup 3. The bearing cup 3 is provided with needle rollers 32 on an inside surface of a cup 31, so that the cup 31 is free to rotate relative to the race 21. The cup 31 according to the embodiment is formed with a circumferential groove 3a in an outer peripheral surface thereof (There is also known a cup free from the circumferential groove 3a). A seal 4 having a ring-like overall configuration is attached to an end of the bearing cup 3, thereby sealing a gap between a neck 22 of the cross shaft 2 and the cup 31 so as to prevent the invasion of muddy water and dusts into the cup 31. It is noted here that the race 21, the neck 22, the seal 4 and the bearing cup 3 are positioned in mutually coaxial relation.

Figure 2A:
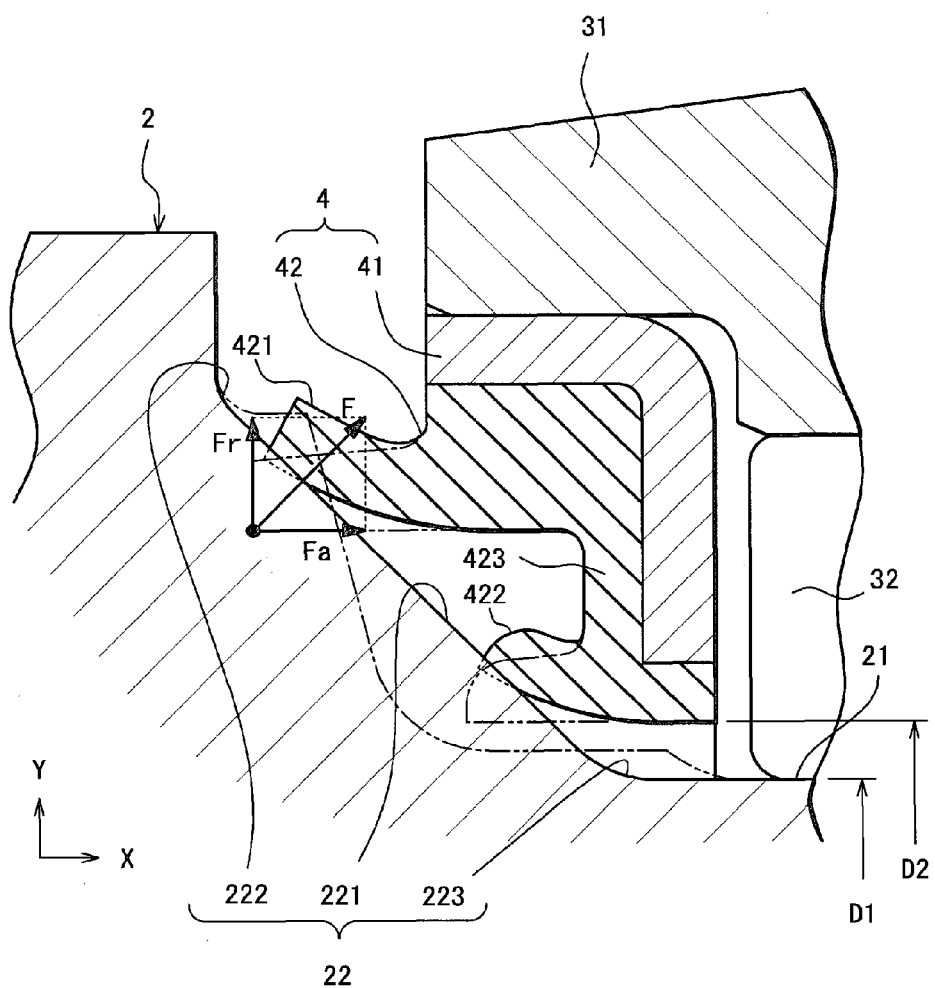
FIG. 2A is an enlarged view of a part II in FIG. 1.
Figure 14:
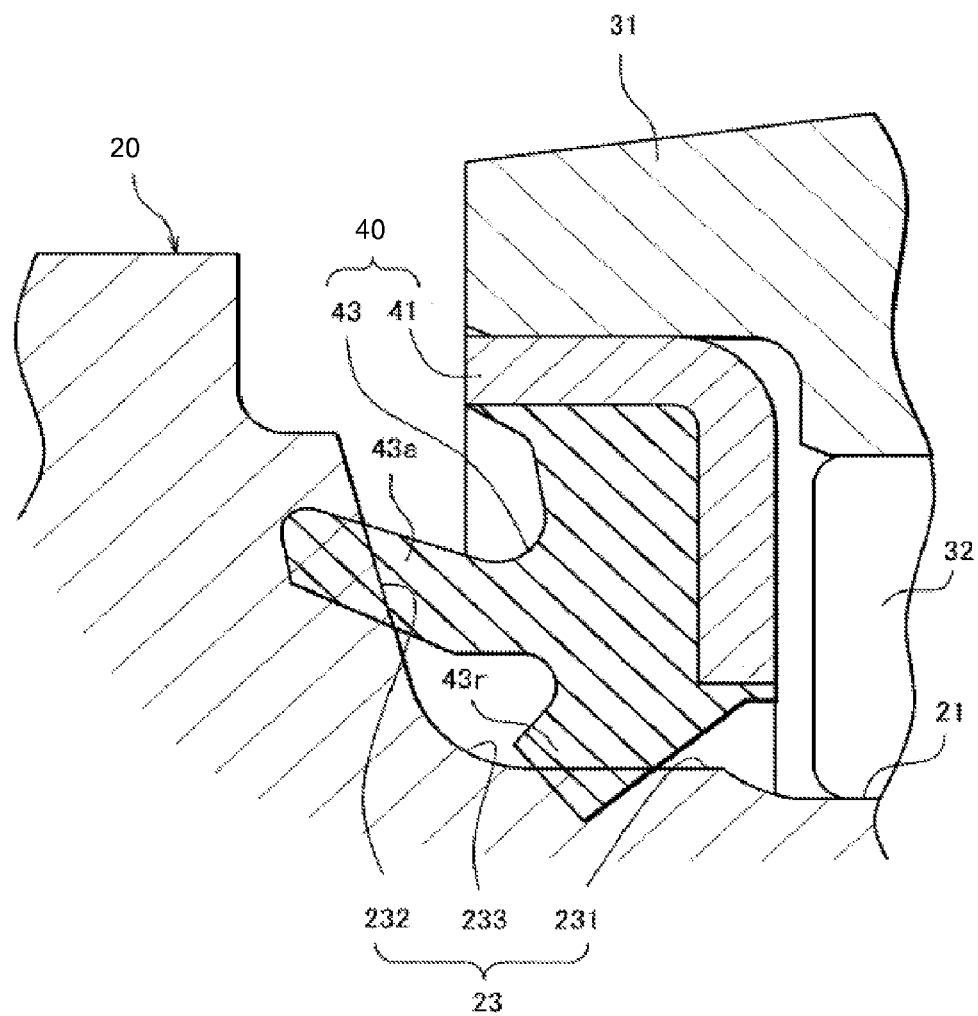
FIG. 14 is an enlarged view of a part XIV in FIG. 13.

FIG. 2A is an enlarged view of a part II in FIG. 1. Referring to the figure, the cross shaft 20 includes the neck 22 on a proximal side of the race 21. The neck serves as a "sealed portion" against which the seal 40 is pressed. The solid line delineates a configuration of the neck 22 of the embodiment, whereas the chain double-dashed line delineates a configuration of a conventional neck (FIG. 14). In the sectional shape shown in the figure, the neck 22 includes: a neck slant portion 221 defined by a straight line inclined at 45° relative to the central axis (X axis) of the race 21 (three-dimensionally defined by a conical surface inclined at 45°); and neck-R portions 222, 223 located at upper and lower ends of the neck slant portion and formed in an arcuate shape. The neck is not formed with such a straight portion as provided in the conventional neck in which the straight portion allows the seal 40 to be pressed from radially outside. Because of the absence of the straight portion, X-wise and Y-wise dimensions of the whole body of the neck 22 are within the conventional size ranges even though there is provided the neck slant portion 221 inclined at 45° as described above. In other words, the elimination of the conventional straight portion permits the neck slant portion 221 having the inclination of 45° to be provided without changing the basic dimensions of the cross shaft 20.

In the conventional neck 23 (FIG. 14), stress is concentrated on the neck-R portion 233 so that the neck-R portion may sometimes sustain cracks or deformation. However, the above neck 22 of the embodiment is dramatically increased in mechanical strength because of a reinforcing effect provided by the neck slant portion 221 inclined at 45° and of the neck-R portion 223 located closer to the race 21 subjected to load and having an increased radius of curvature as compared with the neck-R portion of the conventional neck. Hence, the neck of the embodiment is prevented from suffering the cracks or deformation. Furthermore, the neck 22 has a simpler configuration than the conventional neck and hence, is easy to process.

On the other hand, the seal 4 includes: a metal annular body 41 press-inserted and fixed in the cup 31; and a rubber seal body 42 formed integrally with the metal annular body 41. While the seal body 42 is depicted in a shape of a free state, the seal body is actually elastically deformed as pressed against the cross shaft 2. FIG. 3, FIG. 4, FIG. 5, FIG. 6, FIG. 7 and FIG. 8 show a single body of the seal 4 in front view, rear view, side view, sectional view taken on the line VI-VI in FIG. 3, perspective view as viewed from the front side, and perspective view as viewed from the rear side, respectively.

Referring to FIG. 3 to FIG. 8, the seal body 42 includes: a first axial lip 421 pressed against an upper part of the neck slant portion 221; a second axial lip 422 pressed against a lower part of the neck slant portion 221; and a base portion 423 shared by these lips. Each of the lips 421, 422 is shaped like a cylinder extended in parallel to the central axis of the race 21 and leftward of the base portion 423. The first axial lip 421 extends longer than the second axial lip 422 so as to follow the inclination of the neck slant portion 221. This seal body 42 is not formed with a radial lip such as provided at the conventional seal body. A lip portion of the seal body consists of the above axial lips 421, 422.

On the other hand, an inside diameter (diameter at the innermost circumference of the lip) D2 of the seal 4 is defined as D2>D1 because of a relation with an outside diameter D1 of the race 21. A gap ((D2−D1)/2) defined between these diameters is not extremely small but is substantial as shown in the figure.

The other three races 21 are also provided with the same sealing structures.

The aforementioned cross shaft 2 may be assembled with unillustrated yokes as follows. The race 21 is inserted in a hole of a yoke and then, the bearing cup 3 (with the seal 4 press-inserted therein) is assembled on the race 21. The spider joint 1 is connected with one of the yokes by fitting snap rings (not shown) in the circumferential grooves 3a of the two bearing cups 3 at the opposite ends of one shaft (e.g., X-shaft). The spider joint 1 is also connected with the other yoke the same way. By making connection in this manner, the bearing cup 3 is forcibly moved to a predetermined axial position relative to the cross shaft 2. When the bearing cup 3 is assembled on the race 21, a left-hand inside circumferential edge defined by the needle rollers 32 arranged on the overall circumference of the cup is brought into conformity with a right-hand outside circumferential edge of the race 21, thereby accomplishing coaxial alignment between the race 21 and the bearing cup 3. In this process, the inside diameter D2 of the seal 4 is greater than the outside diameter D1 of the race 21 and hence, the second axial lip 422 provides the gap between itself and the race 21 so that the seal does not interfere with the race 21. This eliminates a fear that a distal end of the second axial lip 422 is inverted (tucked back) or that the bearing cup 3 with the inverted axial lip is press-fitted on the race. That is, the inversion of the lip is assuredly prevented. Furthermore, since the seal body does not interfere with the race 21, the seal body 42 is not increased in internal pressure until the axial lips 421, 422 are pressed against the neck slant portion 221. It is therefore easy to assemble the bearing cup 3 on the cross shaft 2.

On the other hand, each of the axial lips 421, 422 receives a force F at its portion pressed against the neck slant portion 221, the force acting to push back the lip in a normal (rectangular) direction with respect to the neck slant portion 221. This force F includes an axial component Fa constituting an axial straining force on the seal 4, and a radial component Fr constituting a radial straining force on the seal 4. The magnitude of the component Fa (=magnitude of F×cos 45°) is basically equal to the magnitude of the component Fr (=magnitude of F×sin 45°). Therefore, each of the axial lips 421, 422 exhibits not only an axial sealing action but also a radial sealing action of the same magnitude as the above. That is, the lip per se is the axial lip extended in the axial direction, while exhibiting as much sealing action as the radial lip due to the relation with the neck slant portion 221.

In addition, the axial lips 421, 422 are extended in parallel to the axial direction. Therefore, even if the seal 4 is varied in the amount of interference, the axial lips are less varied in contact surface pressure distribution than the conventional axial lip 43a (FIG. 14) extended at a predetermined angle (about 25°) with respect to the axial direction. Accordingly, the axial lips are thought to contribute to the consistent sealing performance.

Figure 9:
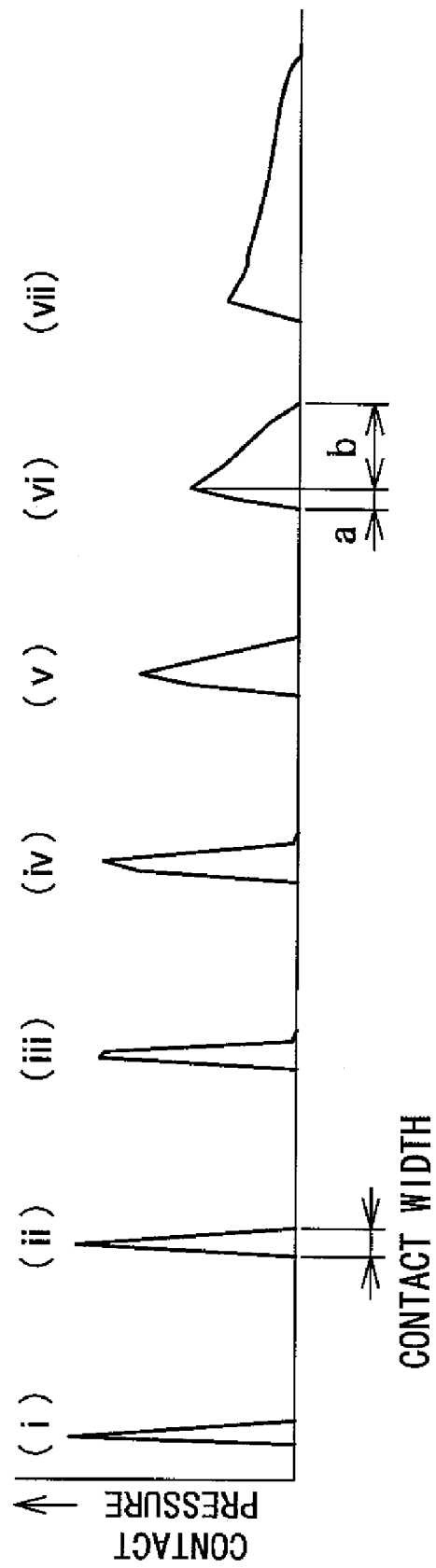
FIG. 9 is a graph schematically showing the results of a test for the contact surface pressure distribution of the above seal, as obtained varying the amount of interference.

Next, description is made on the contact surface pressure distribution of the seal determined by FEM analysis. The present inventors have confirmed that the results of FEM analysis on the contact surface pressure distribution do not significantly deviate from the experimental values. Accordingly, it may be said that the results of the FEM analysis substantially accurately represent the actual contact surface pressure distribution. FIG. 9 is a graph schematically showing the results of a test for the contact surface pressure distribution of the above seal 4, as obtained varying the amount of interference of the seal. In this example, a distribution pattern (i) presents the minimum amount of interference while the amounts of interference are progressively increased in this order to reach the maximum amount of a distribution pattern (vii). The term "contact width" as used in the figure means, for example, the width of a contact area between the first axial lip 421 and the neck slant portion 221 as determined on the surface of the neck slant portion 221 along an inward-outward direction thereof. The left-hand side of each distribution pattern is the atmosphere side (the upper side with respect to the first axial lip 421 shown in FIG. 2A), whereas the right-hand side is the grease side (the lower side with respect to the first axial lip 421).

Figure 2B:
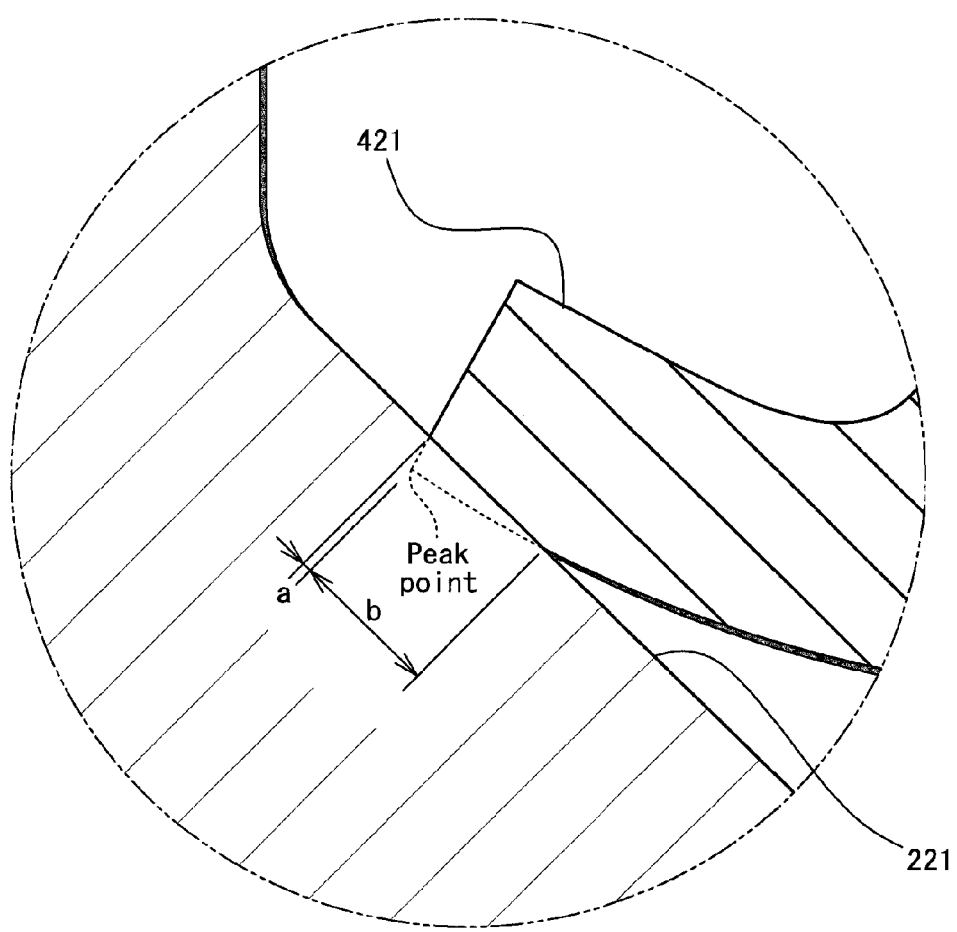
FIG. 2B is an enlarged view of a part of FIG. 2A.
Figure 3:
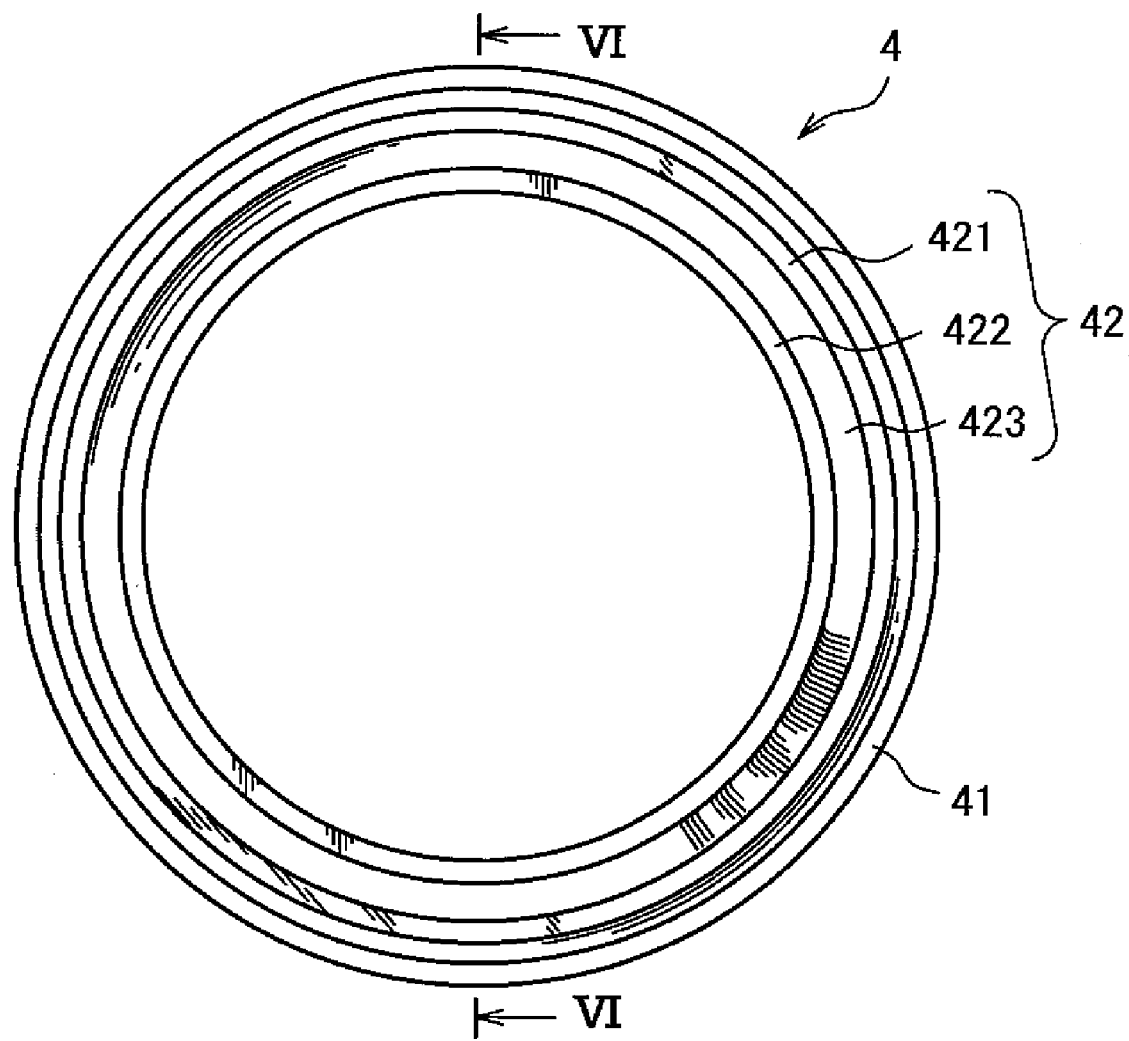
FIG. 3 is a front view showing a single seal used in the spider joint of FIG. 1.
Figure 4:
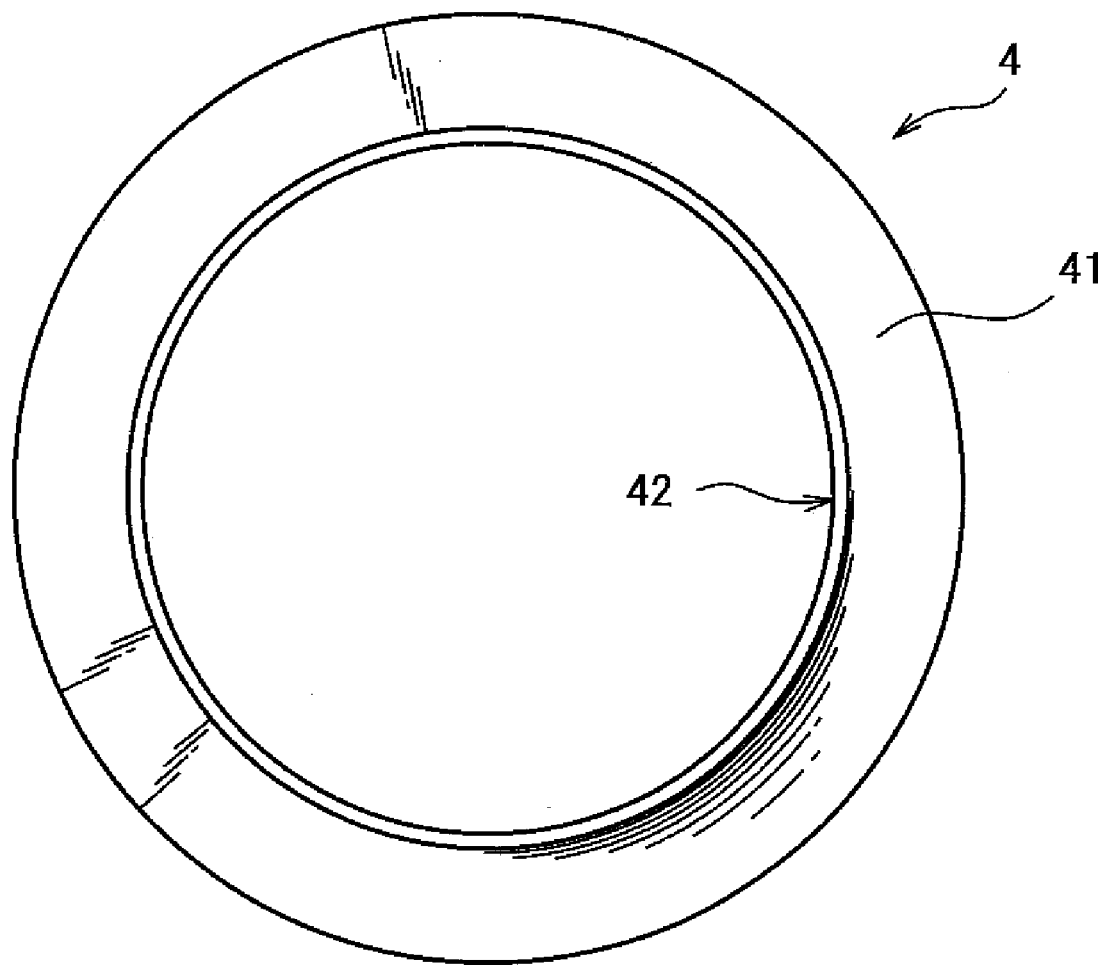
FIG. 4 is a rear view of the above seal.
Figure 5:
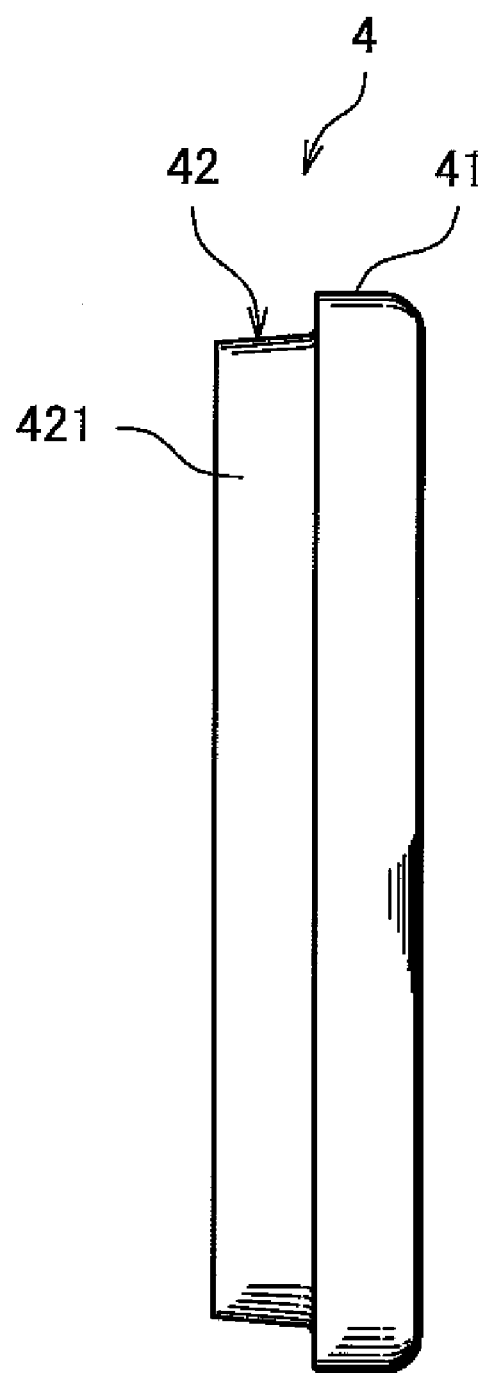
FIG. 5 is a side view of the above seal.
Figure 6:
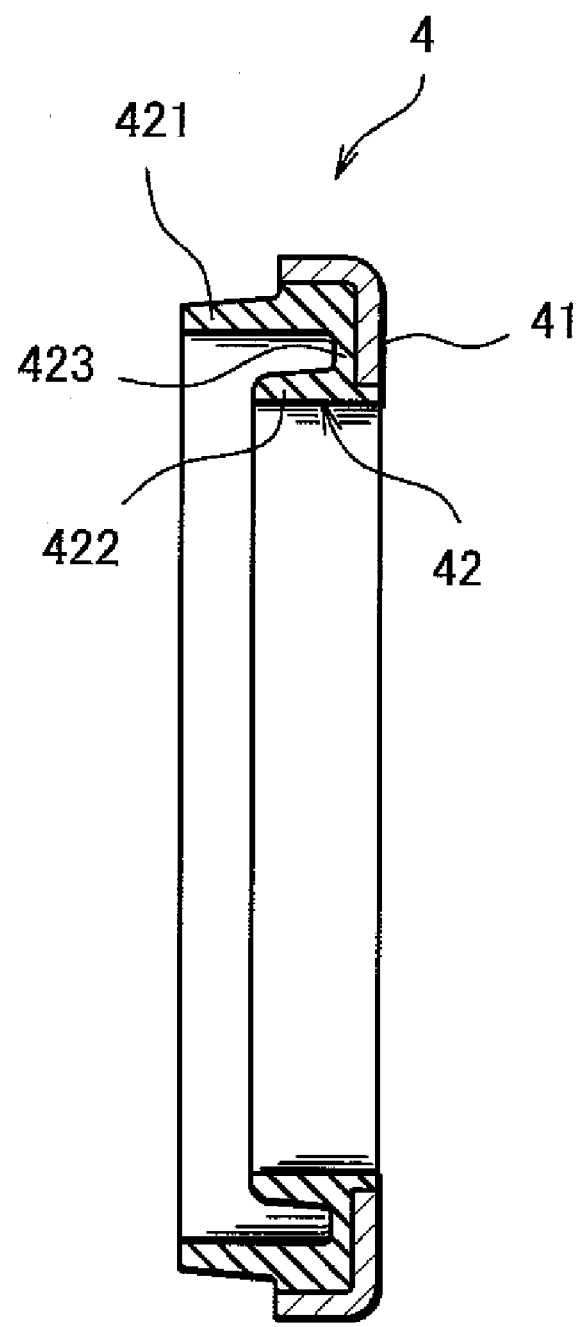
FIG. 6 is a sectional view of the above seal taken on the line VI-VI in FIG. 3.
Figure 7:
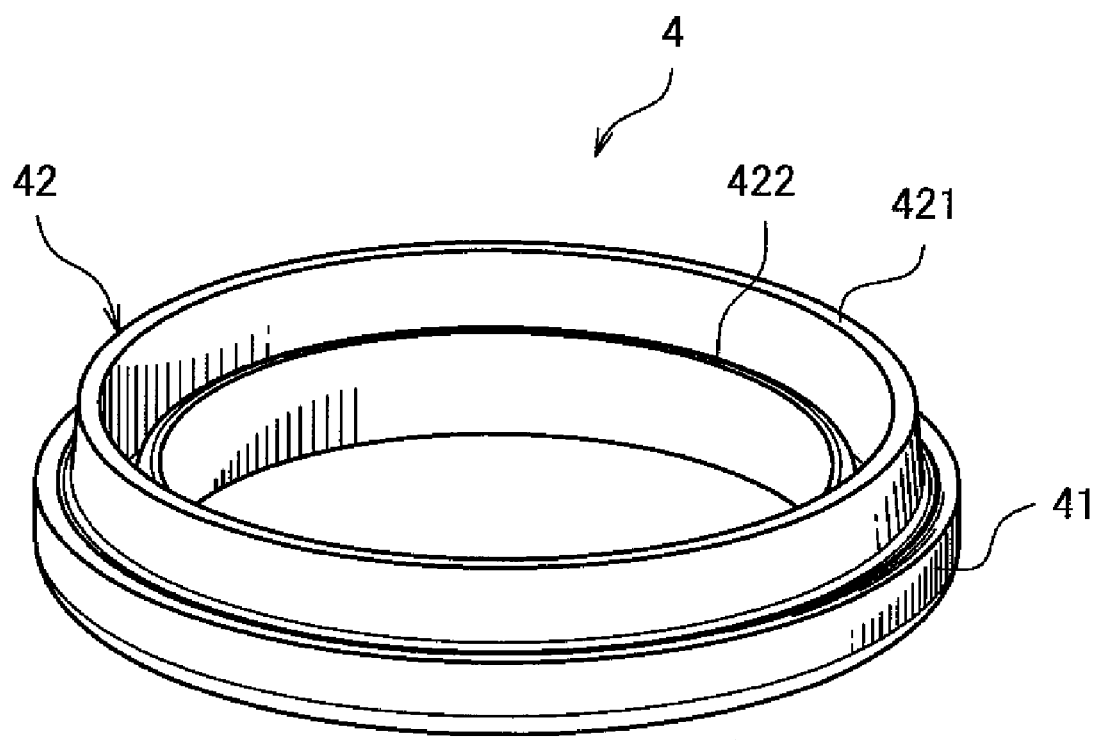
FIG. 7 is a perspective view of the above seal as viewed from the front side.
Figure 8:
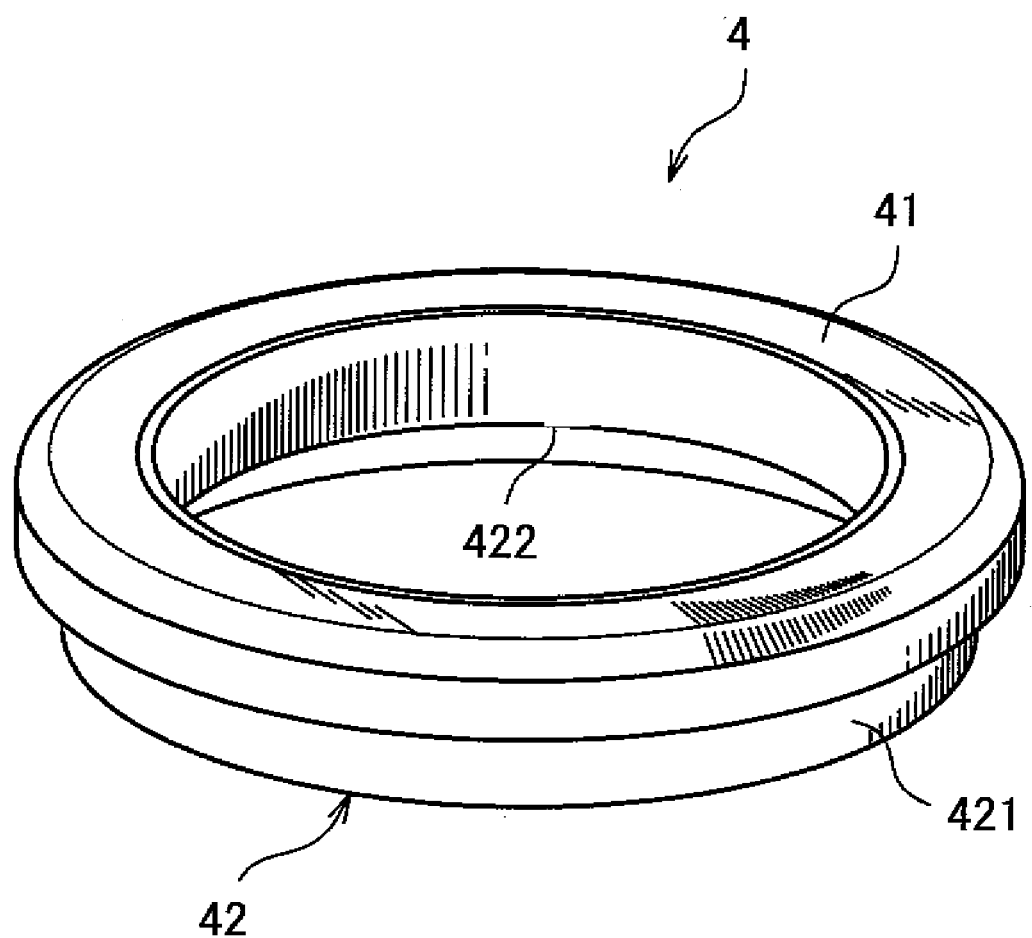
FIG. 8 is a perspective view of the above seal as viewed from the rear side.
Figure 10:
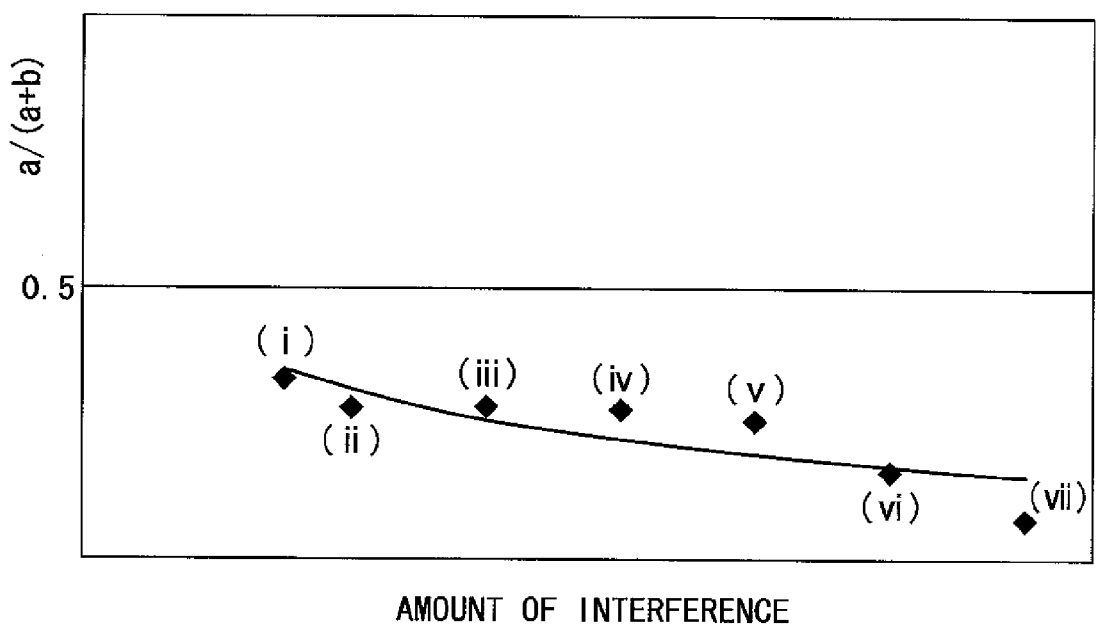
FIG. 10 is a graph wherein the respective values a/(a+b) corresponding to the amounts of interference (i) to (vii) in FIG. 9 are plotted against the respective amounts of interference while the variations of the value are schematically represented by a continuous solid line.

As shown in the figure, the smaller the amount of interference, the sharper the peak of the distribution pattern. As the amount of interference increases, the contact width is correspondingly increased while the peak value of the contact pressure correspondingly decreases. Assumed that the left-hand and right-hand widths of the distribution pattern with respect to the peak are represented by 'a' and 'b', respectively, as shown in FIG. 2B and FIG. 9. The values of a/(a+b) corresponding to the respective patterns (i) to (vii) in FIG. 9 are plotted against the respective amounts of interference. The variations of the above value are schematically represented by the continuous solid line in FIG. 10. In the figure, the horizontal line represents a/(a+b)=0.5. As shown in the figure, the values a/(a+b) at the individual plots are less than 0.5 and are not varied so much in spite of the variations of the amount of interference.

In principle, a sealing surface has a characteristic to push fluid from a side of gentle pressure-distribution curve to a side of steep pressure-distribution curve. Therefore, the value a/(a+b) gives an indication of the sealing performance. In the above case where the value a/(a+b) is less than 0.5, the seal has a characteristic to push the grease from the grease side to the atmosphere side so that a good sealing performance may be obtained. Conversely if the value a/(a+b) is more than 0.5, the sealing performance is not obtained because of a characteristic to suck in fluid (such as water) from outside.

According to the sealing structure of the embodiment as described above, the value a/(a+b) is not varied so much in spite of the variations of the amount of interference and besides, is less than 0.5. Therefore, the sealing structure can provide the consistent sealing performance substantially unsusceptible to the variations of the amount of interference.

Accordingly, there may be provided the sealing structure and spider joint which exhibit the consistent, reliable muddy-water resistance performance in spite of the variations of the amount of interference of the seal 4.

It has been confirmed from the FEM analysis that the neck slant portion 221 having the inclination of 45°, as suggested by the embodiment, achieves the most excellent result in terms of the consistency of the sealing performance (a/(a+b)) against the variations of the amount of interference. It is noted, however, the inclination need not be exactly at 45° but in practice, the neck slant portion having an inclination of 45° may adequately serve the purpose. In addition, the inclinations having deviations within a margin of ±10° may commensurately be effective to stabilize the sealing performance and hence, such a margin of deviations is not excluded.

In cases, the conventional spider joint (FIG. 14) may encounter the following problem. Since the radial lip 43r interferes with the race 21 when the bearing cup 3 is assembled on the race 21, the radial lip 43r may be inverted (tucked back) in the opposite direction to that the bearing cup 3 is press-inserted. In such an inverted state, the radial lip 43r cannot achieve a desired sealing performance. The inversion of the radial lip 43r may be prevented by increasing the rigidity thereof. In this case, however, the high rigidity impairs the sealing performance to some degree.

However, the spider joint according to the embodiment is adapted to ensure the sealing performance without the radial lip pressed against the race 21 from radially outside, because the axial lips 421, 422 pressed against the neck slant portion 221 in the direction of the central axis thereof attain the axial and radial straining forces. Since the diameter D2 at the innermost circumference of the lip is greater than the outside diameter D1 of the race, there is no lip interfering with the race 21 when the bearing cup 3 is assembled on the race 21. Accordingly, there is no fear of lip inversion. Thus is provided the spider joint provided with the sealing structure adapted to prevent the lip inversion without decreasing the sealing performance.

Figure 11:
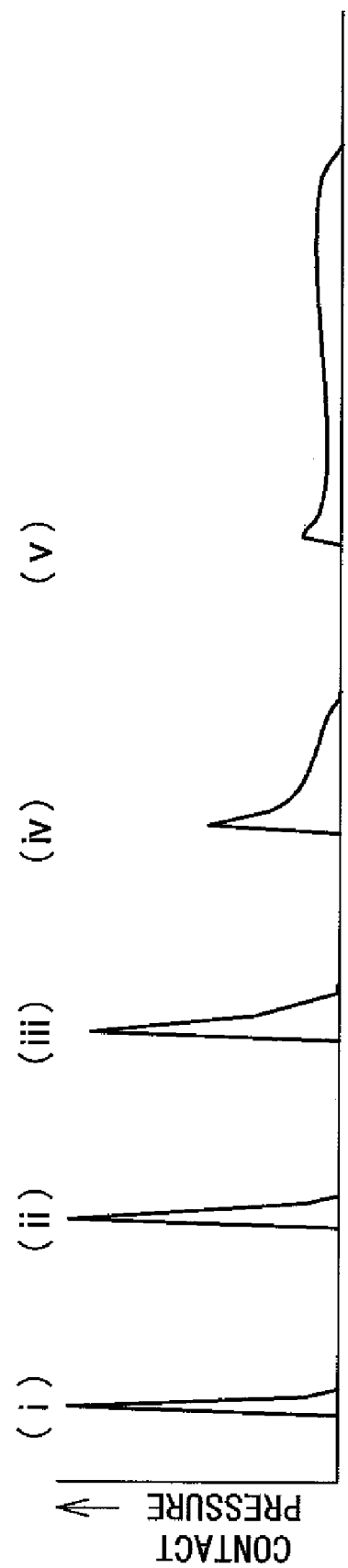
FIG. 11 is a graph schematically showing the results of a test for the contact surface pressure distribution of a conventional seal, as obtained varying the amount of interference.
Figure 12:
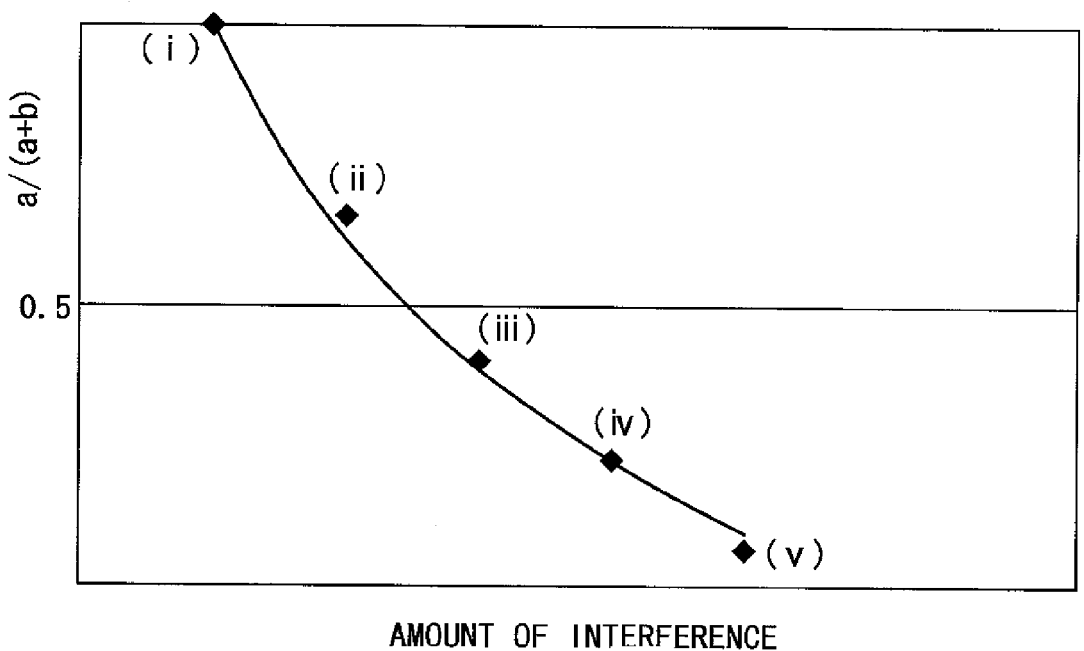
FIG. 12 is a graph wherein the respective values a/(a+b) corresponding to the amounts of interference (i) to (v) in FIG. 11 are plotted against the respective amounts of interference while the variations of the value are schematically represented by a continuous solid line.
Figure 13:
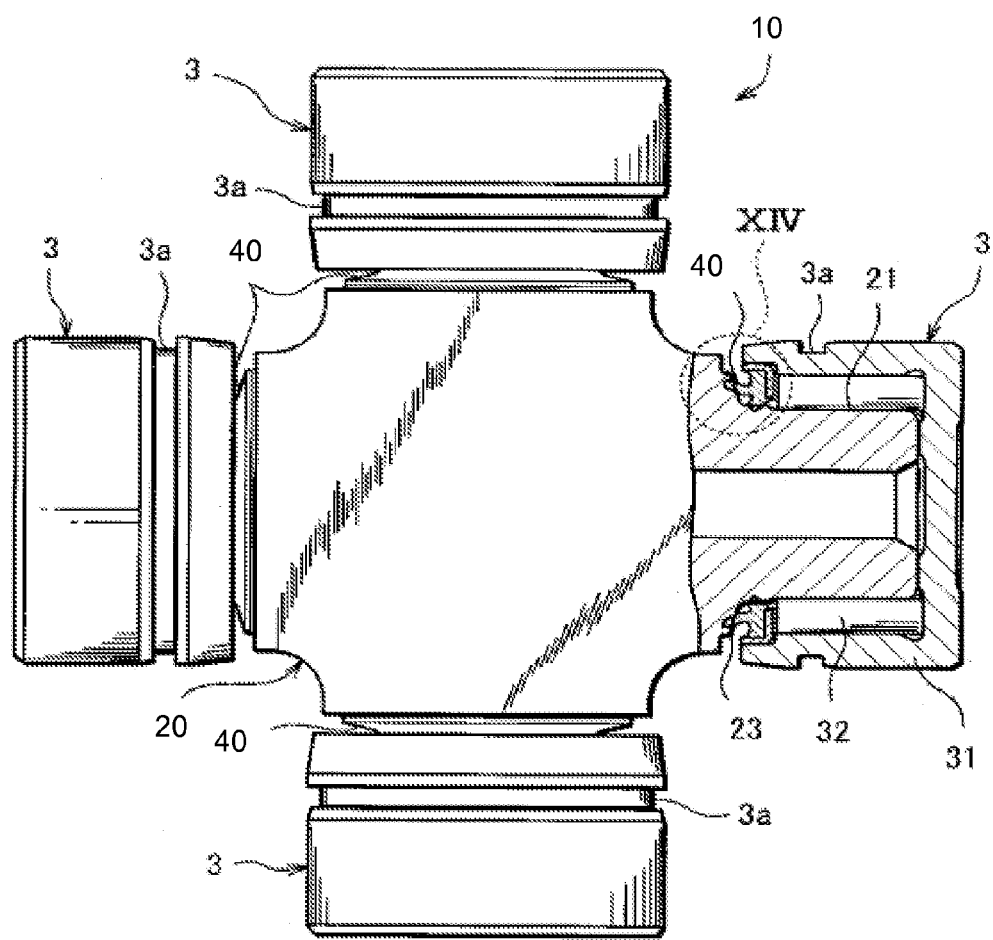
FIG. 13 is a front view (partly in section) showing a conventional spider joint.

FIG. 11 is a graph showing the results of FEM analysis similarly performed on the seal of the conventional example (FIG. 14) for comparison purpose. The respective amounts of interference (i) to (v) are equal to the respective amounts of interference (i) to (v) in FIG. 9. FIG. 12 shows the results of plotting the individual values of a/(a+b) of the respective distribution patterns (the amounts of interference) in FIG. 11. The values a/(a+b) in correspondence to the amounts of interference vary greatly. Furthermore, the value a/(a+b) may be below 0.5 or above 0.5 depending upon the amounts of interference. It is apparent that the sealing performance is instable. In the cases of the amounts of interference (i) and (ii) presenting the a/(a+b) values in excess of 0.5, the sealing performance is not assured as described above. In the case of the amount of interference (v) where the contact pressure is significantly decreased and where an additional peak to the left-hand peak exists on the right-hand side, it is known that the seal has a poor sealing performance. Therefore, the seal of the conventional example may ensure the sealing performance in respect of only the amounts of interference of (iii) and (iv).

In contrast, the embodiment can ensure the sealing performance in respect of the amounts of interference (i) to (vii) in FIG. 9. When the amounts of interference (i) to (v) of the embodiment are compared with those of the conventional example, the interferences of the embodiment have smaller contact widths than those of the conventional example. Therefore, the lip of the embodiment has a small sliding resistance so as to be decreased in dragging torque as compared with the lip of the conventional example. This contributes to a low-torque rotation of the bearing cup 3.

In the above embodiment, the axial lips 421, 422 are extended in parallel to the axial direction but may not be exactly in parallel to the axial direction. Assumed that the parallel direction is at 0°, for example, the extension direction of the axial lips may have an error margin of 0±10°.

The number of axial lips 421, 422 is not limited to two. Three or more axial lips may be provided if it is necessary. Conversely, there may be provided one axial lip.

The sealing structure according to the above embodiment is not only applied to the spider joint but may also be applied to a variety of sealing structures involving axial motions.

The invention claimed is:

1. A sealing structure comprising:
a seal having a ring-like overall configuration and including a lip portion consisting of a plurality of cylindrical axial lips axially extended in different lengths, each of the lips in a free state having an inner surface extending in parallel to an axial direction thereof; and
a sealed portion having a conical surface positioned coaxially with the seal and allowing the plural axial lips to make contact with the conical surface in a direction of a central axis thereof, each of the lips forming a contact width on the conical surface along an inward-outward direction thereof including an outside width from a peak point of contact pressure and an inside width from the peak point that is wider than the outside width, the peak point of contact pressure being at an edge of the lip.

2. A sealing structure comprising:
a seal having a ring-like overall configuration and including an axial lip extended substantially in parallel to an axial direction thereof, the lip in a free state having an inner surface extending in parallel to the axial direction; and
a sealed portion having a conical surface positioned coaxially with the seal and inclined substantially at 45° relative to a central axis thereof, and allowing the axial lip to make contact with the conical surface in the direction of a central axis thereof, the lip forming a contact width on the conical surface along an inward-outward direction thereof including an outside width from a peak point of contact pressure and an inside width from the peak point that is wider than the outside width, the peak point of contact pressure being at an edge of the lip.

3. A spider joint comprising:
a cross shaft formed with a neck slant portion on a proximal side of each of a plurality of races, the neck slant portion being defined by a conical surface inclined at a predetermined angle relative to an axis of each of the races;
a bearing cup assembled on each of the races; and
a seal assembled in the bearing cup, having a ring-like overall configuration and including a lip portion which is in contact with the neck slant portion in a direction of a central axis thereof and which consists of a plurality of cylindrical axial lips extended axially, each of the lips in a free state having an inner surface extending in parallel to an axial direction thereof, each of the lips forming a contact width on the conical surface along an inward-outward direction thereof including an outside width from a peak point of contact pressure and an inside width from the peak point that is wider than the outside width, the peak point of contact pressure being at an edge of the lip.

4. A spider joint according to claim 3, wherein the seal has a greater inside diameter at the innermost circumference of the lip in a free state than an outside diameter of the race.

5. A spider joint comprising:

a cross shaft formed with a neck slant portion on a proximal side of each of a plurality of races, the neck slant portion being defined by a conical surface inclined substantially at 45° relative to an axis of each of the races;

a bearing cup assembled on each of the races; and a seal assembled in the bearing cup, having a ring-like overall configuration and including a lip portion which is in contact with the neck slant portion in a direction of a central axis thereof and which comprises an axial lip extended substantially in parallel to an axial direction, the lip in a free state having an inner surface extending in parallel to the axial direction, the lip forming a contact width on the conical surface along an inward-outward direction thereof including an outside width from a peak point of contact pressure and an inside width from the peak point that is wider than the outside width, the peak point of contact pressure being at an edge of the lip.

* * * * *